(12) United States Patent
Angus et al.

(10) Patent No.: US 9,319,477 B2
(45) Date of Patent: Apr. 19, 2016

(54) METHODS AND SYSTEMS FOR COMMUNICATING BETWEEN A VEHICLE AND A REMOTE APPLICATION SERVER

(75) Inventors: Ian Gareth Angus, Mercer Island, WA (US); Travis Stephen Reid, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1103 days.

(21) Appl. No.: 12/900,872

(22) Filed: Oct. 8, 2010

(65) Prior Publication Data

US 2012/0089684 A1 Apr. 12, 2012

(51) Int. Cl.
| | | |
|---|---|---|
| G06F 15/16 | (2006.01) | |
| H04L 29/08 | (2006.01) | |
| H04L 12/815 | (2013.01) | |
| H04L 12/851 | (2013.01) | |

(52) U.S. Cl.
CPC ............ *H04L 67/2814* (2013.01); *H04L 47/22* (2013.01); *H04L 67/12* (2013.01); *H04L 47/2433* (2013.01)

(58) Field of Classification Search
CPC ..... G06Q 10/107; H04L 12/585; H04L 12/58
See application file for complete search history.

(56) References Cited

U.S. PATENT DOCUMENTS

| | | | |
|---|---|---|---|
| 6,147,980 A | | 11/2000 | Yee et al. |
| 6,381,712 B1 * | | 4/2002 | Nemitz ........................... 714/57 |
| 6,711,610 B1 | | 3/2004 | Harris |
| 7,096,101 B2 * | | 8/2006 | Sonnenrein et al. ......... 701/31.5 |
| 7,986,914 B1 * | | 7/2011 | Henry et al. .................. 455/3.06 |
| 8,515,616 B2 * | | 8/2013 | Hering et al. ................ 701/31.5 |
| 2002/0123344 A1 * | | 9/2002 | Criqui et al. .................. 455/431 |
| 2003/0008611 A1 * | | 1/2003 | Forman et al. ............... 455/3.01 |
| 2004/0116140 A1 * | | 6/2004 | Babbar et al. ................ 455/517 |
| 2006/0154660 A1 * | | 7/2006 | Waugh et al. ................ 455/428 |
| 2006/0235580 A1 * | | 10/2006 | Weiss et al. ........................ 701/2 |
| 2007/0140152 A1 * | | 6/2007 | Allen et al. .................... 370/310 |
| 2007/0198160 A1 * | | 8/2007 | Sheynblat ....................... 701/93 |
| 2009/0058682 A1 * | | 3/2009 | True .............................. 340/971 |
| 2009/0112569 A1 | | 4/2009 | Angus et al. |

(Continued)

FOREIGN PATENT DOCUMENTS

| | | |
|---|---|---|
| EP | 1798872 A2 | 6/2007 |
| EP | 1798872 A3 | 6/2007 |

OTHER PUBLICATIONS

International Search Report and Written Opinion of international application No. PCT/US2011/052620; Dec. 20, 2011; 12 pages.

(Continued)

*Primary Examiner* — Philip Chea
*Assistant Examiner* — Van Kim T Nguyen
(74) *Attorney, Agent, or Firm* — Armstrong Teasdale LLP

(57) ABSTRACT

Methods and apparatus for use in communicating between a vehicle and a remote application server. An application message is received from a vehicle. A computer system determines whether an uplink connection can be established between the computer system and a remote application server that provides a remote software application associated with the application message. The application message is redirected to a local software application executed by the computer system when an uplink connection cannot be established. Data may be subsequently synchronized between the local software application and the remote software application.

20 Claims, 5 Drawing Sheets

(56) References Cited

U.S. PATENT DOCUMENTS

| | | |
|---|---|---|
| 2009/0117895 A1* | 5/2009 | McGuffin ............... 455/431 |
| 2009/0197596 A1* | 8/2009 | Wahler et al. ............ 455/431 |
| 2011/0078182 A1* | 3/2011 | Fenyes et al. ............ 707/770 |
| 2011/0162016 A1* | 6/2011 | Petrisor et al. ............ 725/77 |
| 2012/0044089 A1* | 2/2012 | Yarnold et al. ........... 340/901 |
| 2012/0178416 A1* | 7/2012 | Miklos et al. ............ 455/410 |

OTHER PUBLICATIONS

Notice of First Office Action for CN Application No. 2011800487854, Jul. 9, 2015, 20 pages.

\* cited by examiner

METHODS AND SYSTEMS FOR COMMUNICATING BETWEEN A VEHICLE AND A REMOTE APPLICATION SERVER

BACKGROUND

The field of the disclosure relates generally to communication between a computer system onboard a vehicle and a remote computer system and more specifically, to methods and systems for communicating application messages from a vehicle computer system to a remote application server.

At least some known vehicles, such as aircraft, include computer systems that use application messages to communicate data to a remote computer system. Moreover, most if not all of known vehicle computer systems connect to a local network using a predetermined communication standard, such as a wireless networking standard, to perform such communication.

However, because of complications or other issues, such as, but not limited to, equipment unavailability or network outages, a vehicle computer system may be incapable of connecting to a local network. Moreover, without a local network connection, known vehicle computer systems may be unable to communicate with remote computer systems. In such instances, communication must be deferred until a local network connection can be established, thus delaying the delivery of application messages. Further, a high volume of application messages at the vehicle computer system may require an excessive amount of memory and may be at risk of loss in the event of a vehicle computer system malfunction.

BRIEF DESCRIPTION

In one aspect, a method for communicating between a vehicle and a remote application server is provided. The method includes receiving at a computer system an application message transmitted from a vehicle and determining whether the application message should be forwarded to a remote application server that provides a remote software application associated with the application message. The application message is redirected to a local software application executed by the computer system when the application message should not be forwarded.

In another aspect, a gateway device for use in communicating between a vehicle and a remote application server is provided. The gateway device includes a vehicle communications unit configured to receive an application message from a computer system onboard a vehicle, wherein the application message is associated with a destination corresponding to a remote application server that provides a remote software application. The gateway device also includes a processor unit that is coupled to the vehicle communications unit and programmed to execute a local software application corresponding to the remote software application. The processor unit is also programmed to determine whether the application message should be forwarded to the remote application server and to redirect the application message to the local software application when the application message should not be forwarded to the remote application server. The local software application interacts with the computer system in a manner that is indistinguishable from the manner in which the remote software application interacts with the computer system.

In yet another aspect, one or more computer readable media having computer-executable components are provided. The components include a local software application component, a vehicle communication interface component, and a routing component. When executed by the at least one processor unit, the local software application component causes the at least one processor unit to execute a local software application. When executed by the at least one processor unit, the vehicle communication interface component causes the at least one processor unit to receive an application message transmitted by a computer system onboard a vehicle. When executed by the at least one processor unit, the routing component causes the at least one processor unit to determine whether the application message should be forwarded to a remote application server that provides a remote software application associated with the application message, and to redirect the application message to the local software application when the application message should not be forwarded to the remote application server.

The features, functions, and advantages that have been discussed can be achieved independently in various embodiments or may be combined in yet other embodiments further details of which can be seen with reference to the following description and drawings.

DETAILED DESCRIPTION

The described embodiments are directed to communicating between one or more computer systems onboard a vehicle and one or more remote application servers. A vehicle may be, but is not limited to only being, an aircraft, a waterborne ship, a wheeled vehicle, and/or a tracked vehicle.

In an exemplary embodiment, a gateway device operates as a wireless access point for computer systems onboard a vehicle. Application messages transmitted by the computer systems and addressed to remote application servers are received by the gateway device. For each application message, if the gateway device can establish an uplink connection to the corresponding remote application server, the application message is forwarded to that remote application server. If no uplink connection can be established, the application message is redirected to a local software application that may be subsequently synchronized with the remote application server when an uplink connection can be established.

As used herein, an application message is defined as a communication (e.g., information, a request, or a command) provided by a software application executed by a computer system. An application message may be intended for receipt by another software application that is executed by the same computer system or that is executed by a different computer system. Application messages may describe, for example, vehicle sensor data (e.g., sensor readings), events associated with a vehicle (e.g., vehicle control events), telemetry data, financial transactions (e.g., purchases made onboard a vehicle), and/or any other information relevant to operation of a vehicle.

Figure 1:
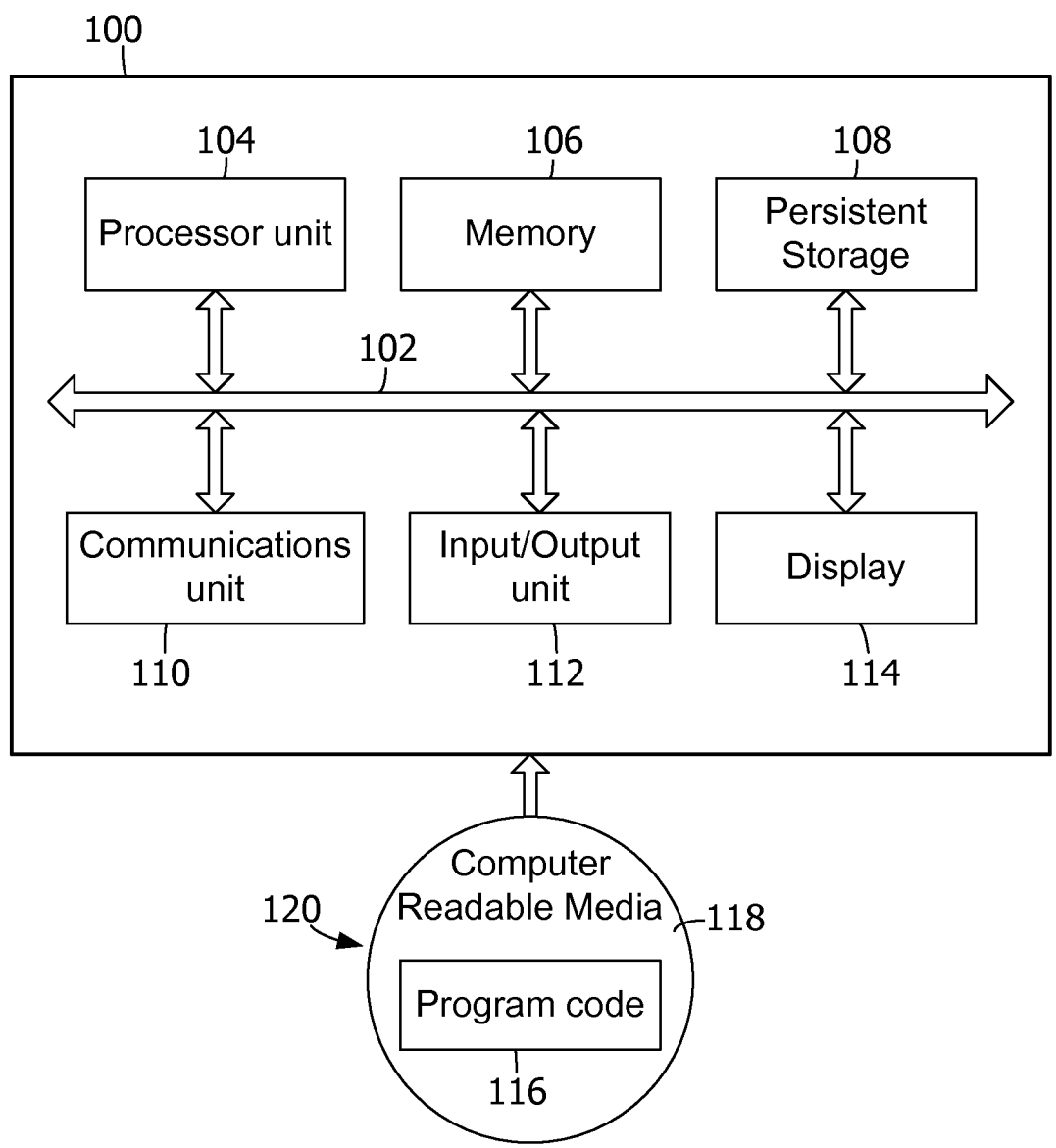
FIG. 1 is a block diagram of an exemplary computer system.

FIG. 1 is a block diagram of an exemplary computer system 100. In the exemplary embodiment, computer system 100 includes communications fabric 102 that provides communications between a processor unit 104, a memory 106, persistent storage 108, a communications unit 110, an input/output (I/O) unit 112, and a presentation interface, such as a display 114. In addition to, or in alternative to, the presentation interface may include an audio device (not shown) and/or any device capable of conveying information to a user.

Processor unit 104 executes instructions for software that may be loaded into memory 106. Processor unit 104 may be a set of one or more processors or may include multiple processor cores, depending on the particular implementation. Further, processor unit 104 may be implemented using one or more heterogeneous processor systems in which a main processor is present with secondary processors on a single chip. In another embodiment, processor unit 104 may be a homogeneous processor system containing multiple processors of the same type.

Memory 106 and persistent storage 108 are examples of storage devices. As used herein, a storage device is any piece of hardware that is capable of storing information either on a temporary basis and/or a permanent basis. Memory 106 may be, for example, without limitation, a random access memory and/or any other suitable volatile or non-volatile storage device. Persistent storage 108 may take various forms depending on the particular implementation, and persistent storage 108 may contain one or more components or devices. For example, persistent storage 108 may be a hard drive, a flash memory, a rewritable optical disk, a rewritable magnetic tape, and/or some combination of the above. The media used by persistent storage 108 also may be removable. For example, without limitation, a removable hard drive may be used for persistent storage 108.

A storage device, such as memory 106 and/or persistent storage 108, may be configured to store data for use with the processes described herein. For example, a storage device may store executable instructions associated with a virtual machine and/or a local software application, application messages, data associated with a local software application, routing configuration data (e.g., a mapping of remote application servers to local software applications), virtual machine configuration data, local software application configuration data, and/or traffic shaping configuration data (e.g., priorities associated with remote software applications).

Communications unit 110, in these examples, provides for communications with other computer systems or devices. In the exemplary embodiment, communications unit 110 is a network interface card. Communications unit 110 may provide communications through the use of either or both physical and wireless communication links.

Input/output unit 112 enables input and output of data with other devices that may be connected to computer system 100. For example, without limitation, input/output unit 112 may provide a connection for user input through a user input device, such as a keyboard and/or a mouse. Further, input/output unit 112 may send output to a printer. Display 114 provides a mechanism to display information to a user. For example, a presentation interface such as display 114 may display a graphical user interface, such as those described herein.

Instructions for the operating system and applications or programs are located on persistent storage 108. These instructions may be loaded into memory 106 for execution by processor unit 104. The processes of the different embodiments may be performed by processor unit 104 using computer implemented instructions and/or computer-executable instructions, which may be located in a memory, such as memory 106. These instructions are referred to herein as program code (e.g., object code and/or source code) that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to computer system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to computer system 100. The tangible form of computer readable media 118 is also referred to as computer recordable storage media. In some instances, computer readable media 118 may not be removable.

Alternatively, program code 116 may be transferred to computer system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 116 may be downloaded over a network to persistent storage 108 from another device or computer system for use within computer system 100. For instance, program code stored in a computer readable storage medium in a server computer system may be downloaded over a network from the server to computer system 100. The computer system providing program code 116 may be a server computer, a workstation, a client computer, or some other device capable of storing and transmitting program code 116.

Program code 116 may be organized into computer-executable components that are functionally related. For example, program code 116 may include a vehicle communication component, a WAN interface component, a local application component, a routing component, an access control component, a traffic shaper component, a control user interface component, and/or any component suitable for the methods described herein. Each component may include computer-executable instructions that, when executed by processor unit 104, cause processor unit 104 to perform one or more of the operations described herein.

The different components illustrated herein for computer system 100 are not meant to provide architectural limitations to the manner in which different embodiments may be implemented. The different illustrative embodiments may be implemented in a computer system including components in addition to or in place of those illustrated for computer system 100. For example, other components shown in FIG. 1 can be varied from the illustrative examples shown.

As one example, a storage device in computer system 100 is any hardware apparatus that may store data. Memory 106, persistent storage 108 and computer readable media 118 are examples of storage devices in a tangible form.

In another example, a bus system may be used to implement communications fabric 102 and may include one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 106 or a cache such as that found in an interface and memory controller hub that may be present in communications fabric 102.

Figure 2:
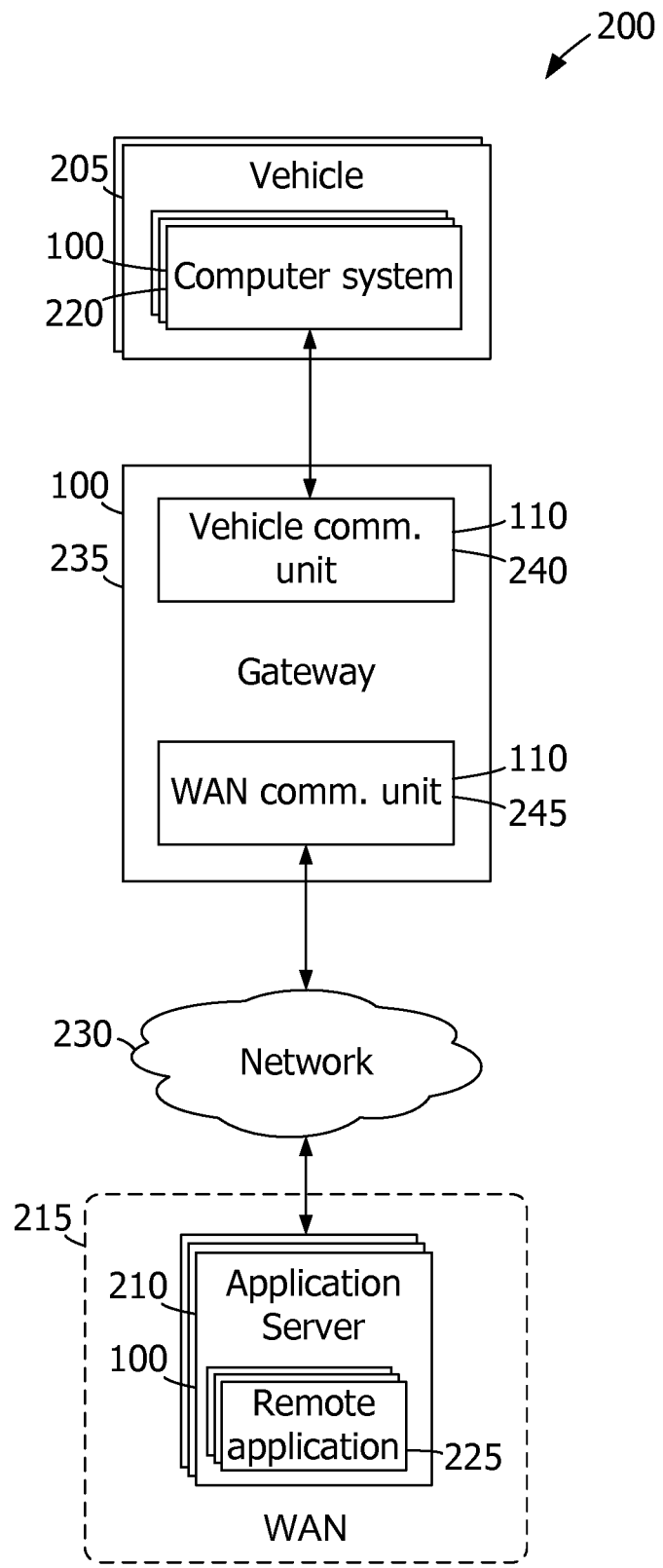
FIG. 2 is a block diagram illustrating an exemplary system that may be used to communicate between one or more vehicles and one or more remote application servers.

FIG. 2 is a block diagram illustrating an exemplary system 200 for use in communicating between one or more vehicles 205 and one or more remote application servers 210 that are part of a wide area network (WAN) 215. In an exemplary embodiment, a vehicle computer system 220 onboard a vehicle 205 executes one or more software applications (not shown) that transmit application messages to one or more remote software applications 225 executed by remote application servers 210. Remote application servers 210 and vehicle computer system 220 are separate examples of computer system 100 (shown in FIG. 1).

Vehicle computer system 220 may be configured to transmit application messages to remote application servers 210 via a network 230. For example, vehicle computer system 220 may establish a direct connection to network 230 using communications unit 110 (shown in FIG. 1) in accordance with a communication standard (e.g., ARINC Specification 822 and/or an IEEE 802.11 standard). (ARINC is a trademark of ARINC, Annapolis, Md. IEEE is a trademark of Institute of Electrical and Electronics Engineers, Inc., New York, N.Y.)

In some scenarios, network 230 may be inaccessible to vehicle computer system 220. For example, vehicle computer system 220 may be configured to communicate with remote application servers 210 via a wireless access point (not shown) that is connected to network 230, and such a wireless access point may be unavailable, such as at an airport that does not have a wireless network infrastructure, or that is inoperable.

Accordingly, in the exemplary embodiment, system 200 includes a gateway device 235, another example of computer system 100, that is used for communicating with vehicle computer system 220. In the exemplary embodiment, gateway device 235 communicates with vehicle computer system 220 via a vehicle communications unit 240 and communicates with network 230 via a WAN communications unit 245. Vehicle communications unit 240 and WAN communications unit 245 are a single example or separate examples of a communications unit 110 (shown in FIG. 1). In some embodiments, vehicle communications unit 240 communicates with vehicle computer system 220 using a first communication standard (e.g., ARINC Specification 822 and/or an IEEE 802.11 standard) and communicates with network 230 using a second communication standard (e.g., Ethernet, a cellular communication standard such as GSM, and/or an IEEE 802.11 standard). (GSM is a trademark of GSM Association, London, UK.) In other embodiments, vehicle communications unit 240 and WAN communications unit 245 may use the same communication standard.

In an exemplary embodiment, gateway device 235 communicates with one or more vehicle computer systems 220 wirelessly while gateway device 235 is proximate to (e.g., within wireless communication range of) one or more vehicles 205. Remote application servers 210 may be remote to vehicle 205, gateway device 235, and/or each other.

Gateway device 235 enables application messages from vehicle computer systems 220 to be communicated to remote software applications 225 via network 230 even when vehicle computer systems 220 are incapable of directly connecting to network 230. Such communication is described below with reference to FIGS. 3-5.

In some embodiments, gateway device 235 is a computer system 100 that provides one or more vehicle-related services in addition to facilitating communication with remote software applications 225. For example, gateway device 235 may be a maintenance laptop that schedules and records maintenance tasks associated with vehicle 205. Gateway device 235 may be positioned onboard vehicle 205. In addition to, or in the alternative, gateway device 235 may be positioned at a service facility, such as at an airport, and may be configured to communicate with vehicle computer systems 220 of a plurality of vehicles 205. For example, gateway device 235 may be positioned at a gate of an airport, such that gateway device 235 is within communication range of vehicles 205 at that gate and one or more adjacent gates.

Figure 3:
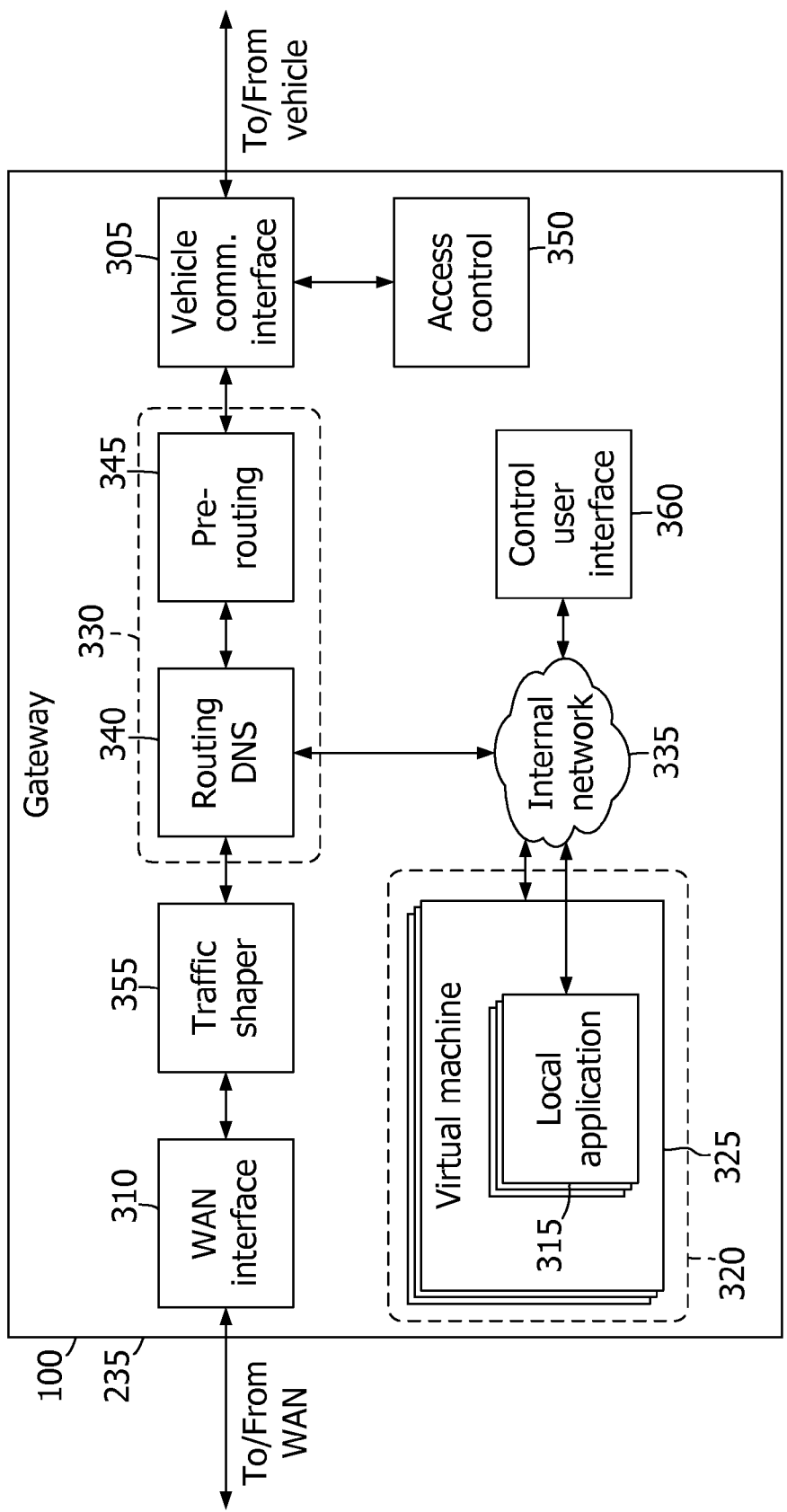
FIG. 3 is a block diagram illustrating software components in an exemplary gateway device that may be used with the system shown in FIG. 2.
Figure 5:
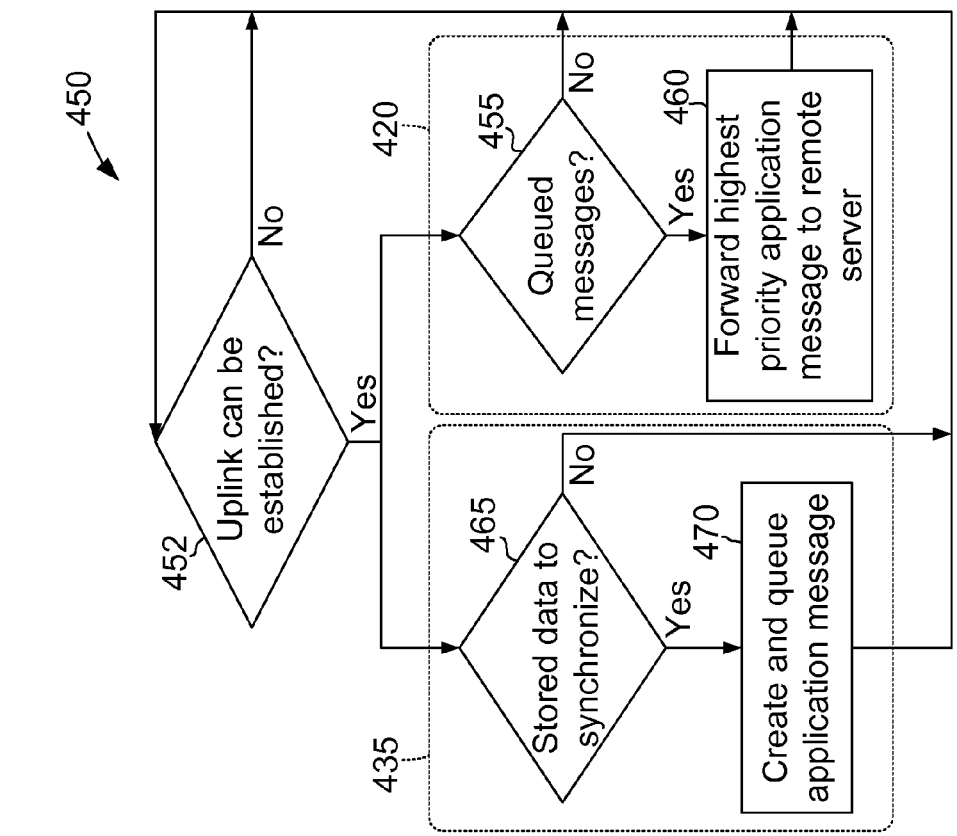
FIG. 5 is a flowchart of an exemplary method for use in transmitting data to a remote application server.
Figure 4:
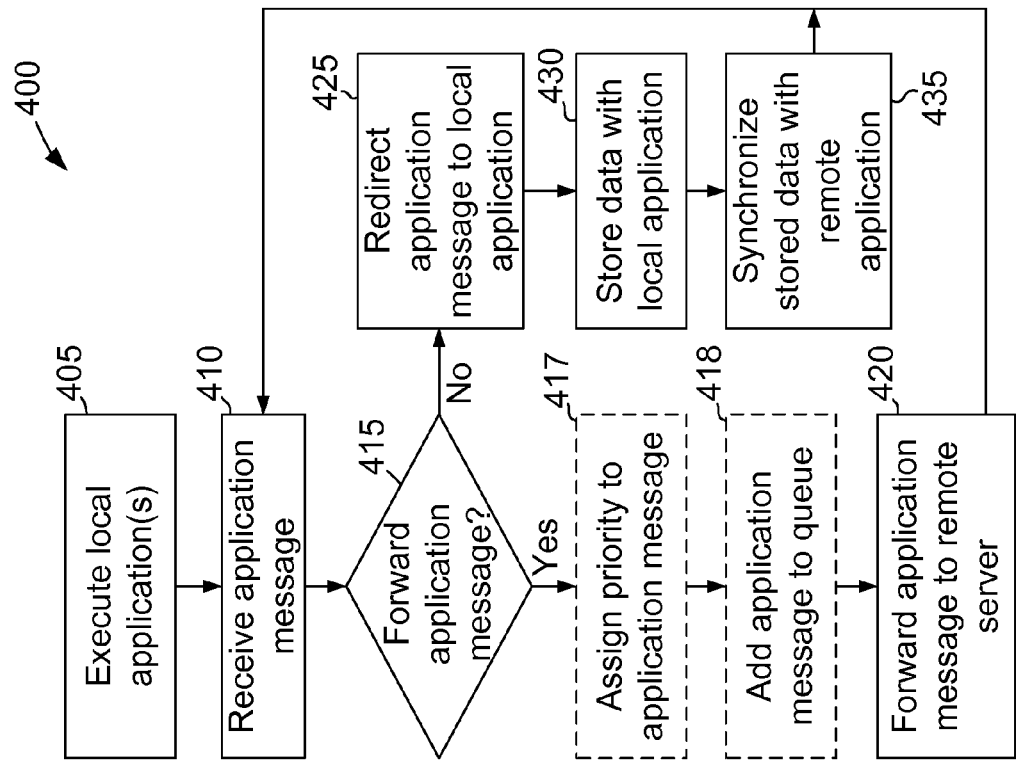
FIG. 4 is a flowchart of an exemplary method for use in communicating between a vehicle and a remote application server.

FIG. 3 is a block diagram illustrating software components in an exemplary gateway device 235 that may be used with system 200. FIG. 4 is a flowchart of an exemplary method 400 that may be used to communicate between a vehicle 205 and a remote application server 210 (shown in FIG. 2). FIG. 5 is a flowchart of an exemplary method 450 for use in transmitting data to remote application server 210.

Referring to FIGS. 2 and 3, in an exemplary embodiment, gateway device 235 includes a vehicle communication interface component 305 for communicating with vehicle computer system 220 via vehicle communications unit 240. Gateway device 235 also includes a WAN interface component 310 for communicating with network 230 via WAN communications unit 245.

Referring to FIGS. 3 and 4, gateway device 235 executes 405 one or more local software applications 315 that correspond to remote software applications 225 (shown in FIG. 2). In an exemplary embodiment, gateway device 235 includes a local application component 320 that executes one or more virtual machines 325. Virtual machine 325, in turn, executes 405 one or more local software applications 315. Local software application 315 may be operable to interact with vehicle computer system 220 (shown in FIG. 2) in a manner indistinguishable from the manner in which remote software application 225 interacts with vehicle computer system 220.

In operation, vehicle communication interface component 305 receives 410 an application message from vehicle computer system 220. The application message is associated with a remote software application 225 provided by a remote application server 210 (shown in FIG. 2). For example, the application message may be directed to a name (e.g., a host name), a network address, and/or a message queue that is associated with remote application server 210.

A routing component 330 determines 415 whether the application message should be forwarded to remote application server 210. In an exemplary embodiment, routing component 330 determines 415 whether immediate forwarding is appropriate based at least in part on a destination address associated with the application message. For example, if the destination address is associated with a remote software application 225 that does not correspond to a local software application 315, routing component 330 may determine that immediate forwarding is appropriate. Such an embodiment facilitates immediately forwarding application messages that cannot be cached at gateway device 235. In one embodiment, routing component 330 determines 415 that immediate forwarding is not appropriate if the destination address is associated with a remote software application 225 that does correspond to a local software application 315.

When routing component 330 determines 315 that the application message should be forwarded, routing component 330 forwards 420 the application message to remote application server 210. For example, routing component 330 may forward 420 the application message via WAN interface component 310. In some embodiments, forwarding 420 the application message to remote application server 210 includes receiving a response to the application message from remote application server 210 and forwarding the response to vehicle computer system 220 via vehicle communication interface component 305.

When routing component 330 determines 415 that the application message should not be forwarded, routing component 330 redirects 425 the application message to local software application 315 via an internal network 335. In an exemplary embodiment, local software application 315 is executed in a virtual machine 325 associated with a network address corresponding to internal network 335. For example, internal network 335 may be implemented as a software component, and each virtual machine 325 may be associated with one or more "virtual" addresses within internal network 335. In some embodiments, redirecting 425 the application message to local software application 315 includes receiving a response to the application message from local software application 315 and forwarding the response to vehicle computer system 220 via vehicle communication interface component 305.

In some embodiments, routing component 330 determines 415 whether the application message should be forwarded at least in part based on an uplink connection status. For example, WAN interface component 310 may determine whether an uplink connection can be established with remote application server 210. In one embodiment, WAN interface component 310 repeatedly (e.g., periodically, continuously, or upon an attempt to transmit a message) determines whether an uplink connection can be established by determining whether a connection can be established with network 230 (shown in FIG. 2). In such an embodiment, when an uplink connection can be established with remote application server 210, routing component 330 may forward 420 the application message to remote application server 210. When an uplink connection cannot be established with remote application server 210, routing component 330 redirects 425 the application message to local software application 315.

In some embodiments, routing component 330 includes a routing Domain Name System (DNS) component 340 and a pre-routing component 345. Routing DNS component 340 and pre-routing component 345 enable redirection 425 of application messages to a network address associated with virtual machine 325 and/or local software application 315 when an uplink connection cannot be established. As used herein, a network address may include, but is not limited to only including, a numerical address, such as an Internet Protocol (IP) version 4 (IPv4) or IP version 6 (IPv6) address.

Routing DNS component 340 enables a name corresponding to remote application server 210 and/or remote application 225 to be translated to a network address. In one embodiment, vehicle communication interface component 305 receives a request for a network address corresponding to remote application server 210 from vehicle computer system 220. When an uplink connection to remote application server 210 can be established, routing DNS component 340 transmits to vehicle computer system 220, in response to the network address request, a network address associated with remote application server 210. When an uplink connection cannot be established, routing DNS component 340 redirects 425 the application message by transmitting to vehicle computer system 220, in response to the network address request, a network address corresponding to virtual machine 325 and/or local software application 315. Vehicle computer system 220 may subsequently transmit an application message directed to the network address, and routing DNS component 340 routes the application message to virtual machine 325 and/or local software application 315 via internal network 335.

In another embodiment, vehicle communication interface component 305 receives, from vehicle computer system 220, an application message that is directed to a name (e.g., a host name and/or a message queue name) corresponding to remote application server 210 and/or remote software application 225. When an uplink connection to remote application server 210 can be established, routing DNS component 340 forwards 420 the application message to a network address corresponding to remote application server 210. When an uplink connection cannot be established, routing DNS component 340 redirects 425 the application message by routing the application message to a network address corresponding to virtual machine 325 and/or local software application 315.

Pre-routing component 345 enables a network address corresponding to remote application server 210 to be translated to a network address corresponding to virtual machine 325 and/or to local software application 315. In one embodiment, vehicle communication interface 305 receives an application message that is associated with a destination network address corresponding to remote application server 210. When an uplink connection to remote application server 210 can be established, pre-routing component 345 enables the application message to be forwarded 420 to remote application server 210. For example, pre-routing component 345 may take no action and/or may simply forward the application message to routing DNS component 340 or WAN interface 310 when an uplink connection can be established. When an uplink connection cannot be established, pre-routing component 345 redirects 425 the application message to the local software application at least in part by routing the application message to a network address corresponding to virtual machine 325 and/or local software application 315.

When an application message is redirected 425 to local software application 315, local software application 315 receives the application message and stores 430 or "caches" data included in the application message. For example, data may be stored 430 in memory 106 and/or in persistent storage 108 (shown in FIG. 1). In some embodiments, the application message is also stored 430. In other embodiments, data included in the application message is stored 430 by executing a data transaction (e.g., an addition, an update, and/or a deletion) based on the application message. For example, an application message indicative of a new sensor reading may be stored 430 by adding the sensor reading to a database in memory 106 or in persistent storage 108.

At a later time, WAN interface component 310 establishes an uplink connection to remote application server 210, and local software application 315 and/or local application component 320 synchronizes 435 the stored data with remote software application 225. Method 400 may be performed repeatedly to forward and/or to cache a plurality of application messages from one or more vehicle computer systems 220.

In some embodiments, gateway device 235 includes an access control component 350 for providing authentication, authorization, and/or accounting of vehicle computer systems 220. For example, access control component 350 may restrict vehicle communication interface 305 to only communicating with vehicle computer systems 220 that supply predetermined credentials, such as a cryptographic key or certificate. Further, access control component 350 may limit the access of vehicle computer system 220 based on such credentials. For example, access control component 350 may prohibit gateway device 235 from forwarding 420 application messages to remote application servers 210 and/or remote software applications 225 that are not authorized by the credentials provided by vehicle computer system 220. In one embodiment, access control component 350 includes a Remote Authentication Dial In User Service (RADIUS) component.

Some embodiments facilitate prioritizing or "shaping" the transmission of application messages by gateway device 235. In an exemplary embodiment, gateway device includes a traffic shaper component 355. Before forwarding 420 an application message to remote application server 210, traffic shaper component 355 assigns 417 a priority to the application message and adds 418 the application message to an outbound queue. In some embodiments, priorities are expressed numerically (e.g., directly or inversely proportional to the magnitude of a specified number) and/or textually (e.g., "low", "normal", and "high").

Referring to FIGS. 3-5, in an exemplary embodiment, method 400 and method 450 are executed by gateway device 235 concurrently. For example, methods 400 and/or 450 may be executed by separate processes and/or threads.

WAN interface component 310 determines 452 that an uplink connection can be established, as described above. Traffic shaper component 355 forwards 420 application messages by determining 455 whether any application messages exist in the outbound queue and, if so, forwarding 460 the application message that has been assigned 417 the highest priority to the remote application server 210 associated with the application message.

In addition, in the exemplary embodiment, when an uplink connection can be established, local software application 315 and/or local application component 320 synchronizes 435 the stored data with remote software application 225 by determining 465 whether any stored data exists to be synchronized 435 and, if so, creating and queuing 470 one or more application messages including the stored data. The application messages may be assigned 417 a priority by traffic shaper component 355, as described above with reference to FIG. 4.

Figure 6:
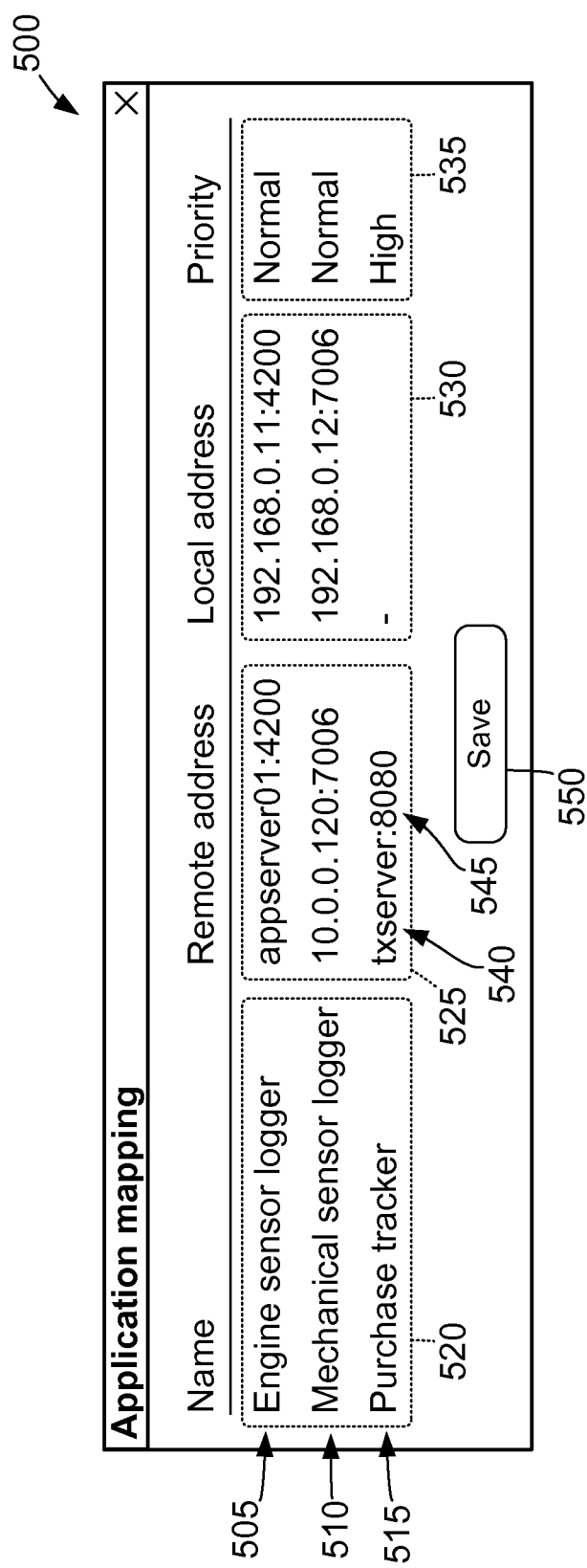
FIG. 6 is an exemplary user interface for use in configuring the gateway device shown in FIG. 3.

In an exemplary embodiment, gateway device 235 includes a control user interface component 360 that enables a user to configure the operation of the components executed by gateway device 235. FIG. 6 is an exemplary user interface 500 for use in configuring gateway device 235. User interface 500 may be provided by control user interface component 360 (shown in FIG. 3) via display 114 (shown in FIG. 1).

In an exemplary embodiment, user interface 500 includes routing information for a first remote software application 505, a second remote software application 510, and a third remote software application 515. For each remote software application, user interface 500 displays a name 520, a network address 525 of the application server executing the remote software application, a network address 530 of a corresponding local software application, if any, and a priority 535.

In the exemplary embodiment, network addresses 525 and 530 are a combination of a host address 540 that may be either a host name or a numeric address (e.g., an IPv4 or IPv6 address), and a port number 545. Priorities 535 are expressed textually, as either "Normal" or "High". A user may select and modify one or more of the values displayed in user interface 500 to configure the behavior of gateway device 235 (shown in FIGS. 2 and 3). In addition to, or in the alternative, user interface 500 may automatically populate one or more values. For example, third remote software application 515 is not associated with a network address 530 for a local software application. Accordingly, user interface 500 may associate third remote software application 515 with a high priority 535. Such an embodiment facilitates prioritizing delivery of application messages associated with a remote software application for which no corresponding local software application exists.

Referring to FIGS. 2-6, in an exemplary embodiment, a first application message is received 410 by vehicle communication interface 305, and WAN interface 310 determines 415 that the first application message should be forwarded. Traffic shaper component 355 assigns 417 a priority to the first application message based on a destination (e.g., a remote application server 210 and/or remote software application 225) associated with the application message. For example, if the first application message is directed to first remote software application 505, traffic shaper component 355 assigns 417 a normal priority to the first application message based on the configuration shown in user interface 500. Traffic shaper component 355 adds 418 the first application message to an outbound queue.

A second application message that is directed to third software application 515 is received 410 before the first application message is forwarded 420 to first remote software application 505. Because the second application message is directed to third remote software application 515, traffic shaper component 355 assigns 417 a high priority to the second application message based on the configuration shown in user interface 500 and adds 418 the second application message to the outbound queue. Traffic shaper component 355 determines 455 that the first and second application messages are in the outbound queue.

Because the second application message has been assigned 417 a priority that is greater than the priority assigned 417 to the first application message, traffic shaper component 355 forwards 460 the second application message to the network address 525 associated with third remote software application 515. Subsequently, traffic shaper component 355 determines 455 that only the first application message is in the outbound queue and forwards 460 the first application message to the network address 525 associated with first remote software application 505. A similar approach may be practiced with application messages created and queued 470 as part of synchronizing 435 stored data with a remote software application 225.

Embodiments described herein enable a vehicle computer system to upload vehicle-related data for eventual delivery to appropriate remote software applications even when the vehicle computer system is incapable of establishing an uplink connection to remote application servers providing such remote software applications. Embodiments provided further facilitate prioritizing the forwarding of vehicle-related data based on a user-defined configuration and/or whether a corresponding local software application exists for a remote software application associated with an application message.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for communicating between a vehicle and a remote application server, said method comprising:
receiving at a computer system an application message transmitted from a vehicle;
determining by the computer system that the application message should not be forwarded to a remote application server that provides a remote software application associated with the application message, including determining that the computer system executes a local software application within a virtual machine that interacts with the vehicle in a same manner as the remote software application; and
redirecting the application message to the local software application executed by the computer system based on the determination that the application message should not be forwarded, by translating a first network address associated with the remote application server in the application message to a second network address associated with the virtual machine executed by the computer system.

2. A method in accordance with claim 1, wherein the local software application stores data included in the application message, said method further comprising, after said redirecting the application message:
establishing an uplink connection with the remote application server; and
synchronizing the stored data with the remote software application provided by the remote application server.

3. A method in accordance with claim 1, wherein the application message is a first application message, said method further comprising forwarding a second application message to the remote application server when it is determined that the second application message should be forwarded to the remote application server.

4. A method in accordance with claim 3, further comprising:
receiving the second application message from the vehicle using a first communication standard; and
forwarding the second application message using a second communication standard.

5. A method in accordance with claim 3, said method further comprising:
assigning a priority to the second application message; and
forwarding the second application message before forwarding a third application message based at least in part on the priority assigned to the second application message and a priority assigned to the third application message.

6. A method in accordance with claim 1, further comprising providing a user interface that enables assigning the first network address associated with the remote application server providing the remote software application, the second network address associated with the local software application that corresponds to the remote software application, and a priority.

7. A method in accordance with claim 1, further comprising determining whether an uplink connection can be established between the computer system and the remote application server.

8. A gateway device for use in communicating between a vehicle and a remote application server, said device comprising:
a vehicle communications unit configured to receive an application message from a computer system onboard a vehicle, wherein the application message is associated with a destination corresponding to a remote application server that provides a remote software application;
a processor unit coupled to said vehicle communications unit and programmed to:
execute a local software application corresponding to the remote software application;
determine that the application message should not be forwarded to the remote application server, including determining that the local software application corresponding to the remote software application is executed by the processor within a virtual machine; and
redirect the application message to the local software application based on the determination that the application message should not be forwarded to the remote application server by translating a first network address associated with the remote application server in the application message to a second network address associated with the virtual machine executed by the processor unit,
wherein the local software application interacts with the computer system in a manner that is indistinguishable from the manner in which the remote software application interacts with the computer system.

9. A gateway device in accordance with claim 8, further comprising a wide area network (WAN) communications unit configured to forward the application message to the remote application server when the application message should be forwarded to the remote application server.

10. A gateway device in accordance with claim 9, wherein the application message is a first application message of a plurality of application messages, and said WAN communications unit is further configured to forward each application message of the plurality of application messages to a remote application server corresponding to the application message when an uplink connection can be established with the corresponding remote application server.

11. A gateway device in accordance with claim 10, wherein said processor unit is further programmed to:
assign a priority to each application message of the plurality of application messages based on a destination associated with the application message; and
forward the application messages assigned a first priority before forwarding the application messages assigned a second priority that is less than the first priority.

12. A gateway device in accordance with claim 8, wherein said vehicle communications unit is configured to receive the application message at least in part by receiving vehicle sensor data.

13. A gateway device in accordance with claim 8, further comprising:
a storage device, wherein the local software application updates data in said storage device in response to the redirected application message; and
a wide area network (WAN) communications unit configured to:
establish an uplink connection with the remote application server after the local software application updates the data; and
transmit the updated data to the remote application server.

14. A gateway device in accordance with claim 8, wherein the local software application is a first local software application that corresponds to a first remote software application and the virtual machine is a first virtual machine, and said processor unit is further programmed to:
- execute a second local software application corresponding to a second remote software application in a second virtual machine;
- determine whether application messages should be forwarded to a second remote application server that provides the second remote software application; and
- redirect, to the second local software application, application messages associated with a destination corresponding to the second remote application server when application messages should not be forwarded to the second remote application server.

15. A gateway device in accordance with claim 8, wherein:
- the application message is a first application message received from a first computer system onboard a first vehicle;
- said vehicle communications unit is further configured to receive a second application message from a second computer system onboard a second vehicle, the second application message associated with the destination corresponding to the remote application server; and
- said processor unit is further programmed to redirect the second application message to the local software application when the second application message should not be forwarded to the remote application server.

16. One or more non-transitory computer readable media having computer-executable components, said components comprising:
- a local software application component that when executed by the at least one processor unit causes the at least one processor unit to execute a local software application;
- a vehicle communication interface component that when executed by at least one processor unit causes the at least one processor unit to receive an application message transmitted by a computer system onboard a vehicle; and
- a routing component that when executed by at least one processor unit causes the at least one processor unit to:
  - determine that the application message should not be forwarded to a remote application server that provides a remote software application associated with the application message, including determining that the local software application is executed within a virtual machine by the at least one processor unit, wherein the local software application interacts with the computer system onboard the vehicle in a same manner as the remote software application; and
  - redirect the application message to the local software application based on the determination that the application message should not be forwarded to the remote application server, by translating a first network address associated with the remote application server in the application message to a second network address associated with the virtual machine executed by the at least one processor unit.

17. One or more non-transitory computer readable media in accordance with claim 16, wherein the application message is a first application message, the local software application creates a second application message based on the first application message, and said components further comprise a wide area network (WAN) interface component that when executed by at least one processor unit causes the at least one processor unit to forward the second application message to the remote application server.

18. One or more non-transitory computer readable media in accordance with claim 16, wherein the application message is a first application message that corresponds to a first remote software application, and said routing component causes the at least one processor unit to forward a second application message to a second remote application server that provides a second remote software application associated with the second application message.

19. One or more non-transitory computer readable media in accordance with claim 18, wherein the second application message is received after the first application message, and said computer-executable components further comprise a traffic shaping component that when executed by at least one processor unit causes the at least one processor unit to:
- associate a first priority with the first remote software application;
- associate a second priority greater than the first priority with the second remote software application; and
- forward the second application message before forwarding the first application message based on the first priority and the second priority.

20. One or more non-transitory computer readable media in accordance with claim 16, wherein said routing component further causes the at least one processor unit to:
- receive, from the computer system onboard the vehicle, a request for a network address corresponding to a name associated with the remote application server; and
- in response to receiving the request, transmit a network address corresponding to the local software application to the computer system.

* * * * *